US009996302B2

(12) United States Patent
Hashimoto et al.

(10) Patent No.: US 9,996,302 B2
(45) Date of Patent: Jun. 12, 2018

(54) STORAGE DEVICE WRITING DATA ON THE BASIS OF STREAM

(71) Applicant: Toshiba Memory Corporation, Tokyo (JP)

(72) Inventors: Daisuke Hashimoto, Cupertino, CA (US); Shinichi Kanno, Ota Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 162 days.

(21) Appl. No.: 15/015,047

(22) Filed: Feb. 3, 2016

(65) Prior Publication Data
US 2016/0291872 A1 Oct. 6, 2016

Related U.S. Application Data

(60) Provisional application No. 62/142,937, filed on Apr. 3, 2015.

(51) Int. Cl.
*G06F 3/06* (2006.01)
*G06F 12/02* (2006.01)

(52) U.S. Cl.
CPC .......... *G06F 3/0679* (2013.01); *G06F 3/064* (2013.01); *G06F 3/0611* (2013.01); *G06F 3/0644* (2013.01); *G06F 3/0652* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 5,613,105 | A  | * | 3/1997  | Zbikowski ............ G06F 3/0601 |
| 8,032,724 | B1 |   | 10/2011 | Smith |
| 8,041,878 | B2 |   | 10/2011 | Lee |
| 8,554,987 | B2 | * | 10/2013 | So ....................... G06F 12/0246 711/103 |
| 8,874,872 | B2 |   | 10/2014 | Feldman et al. |
| 8,935,302 | B2 |   | 1/2015  | Flynn et al. |
| 9,026,734 | B2 |   | 5/2015  | Hashimoto |
| 9,274,942 | B2 |   | 3/2016  | Hashimoto |
| 2011/0040932 | A1 | * | 2/2011 | Frost .................. G06F 12/0246 711/103 |
| 2012/0239990 | A1 | * | 9/2012 | Mataya ............... G06F 12/0866 714/704 |
| 2012/0246388 | A1 | * | 9/2012 | Hashimoto ......... G06F 12/0246 711/103 |

(Continued)

FOREIGN PATENT DOCUMENTS

KR    10-2015-0028   * 3/2015 ............. G06F 13/14

OTHER PUBLICATIONS

Translation of KR-10-2015-0028610. Sep. 2017.*

(Continued)

*Primary Examiner* — Nathan Sadler
(74) *Attorney, Agent, or Firm* — Patterson & Sheridan, LLP

(57) ABSTRACT

A storage device includes a non-volatile semiconductor memory device including a plurality of physical blocks, and a controller configured to associate one of the physical blocks with a stream ID, receive a first command including the stream ID, and in response thereto, transmit information on capacity of unwritten space in the physical block associated with the stream ID.

17 Claims, 16 Drawing Sheets

(56) References Cited

U.S. PATENT DOCUMENTS

| | | | |
|---|---|---|---|
| 2013/0326120 A1* | 12/2013 | Cheng | G06F 12/0246 711/103 |
| 2014/0173178 A1* | 6/2014 | Schwartz | G06F 12/0246 711/103 |
| 2014/0189211 A1* | 7/2014 | George | G06F 3/0613 711/103 |
| 2014/0215129 A1 | 7/2014 | Kuzmin et al. | |
| 2014/0365719 A1 | 12/2014 | Kuzmin et al. | |
| 2015/0046670 A1* | 2/2015 | Kim | G06F 12/0246 711/207 |
| 2015/0074337 A1* | 3/2015 | Jo | G06F 12/0246 711/103 |
| 2015/0331624 A1 | 11/2015 | Law | |
| 2015/0347025 A1 | 12/2015 | Law | |
| 2016/0034354 A1 | 2/2016 | Hashimoto et al. | |
| 2016/0092302 A1* | 3/2016 | Agarwal | G06F 11/1068 714/773 |
| 2016/0253257 A1* | 9/2016 | Kim | G06F 12/0253 711/166 |
| 2016/0266792 A1* | 9/2016 | Amaki | G06F 12/0246 |

OTHER PUBLICATIONS

U.S. Appl. No. 14/656,413, filed Mar. 12, 2015.
U.S. Appl. No. 15/065,465, filed Mar. 9, 2016.
U.S. Appl. No. 15/065,496, filed Mar. 9, 2016.
U.S. Appl. No. 15/015,052, filed Feb. 3, 2016.
U.S. Appl. No. 15/063,311, filed Mar. 7, 2016.
Jeong-UK Kang et., "The Multi-streamed Solid-State Drive", Proceedings of the 6th USENIX Conference on Hot Topics in Storage and File Systems, Jun. 17-18, 2014, 5 pages.
Changman Lee et al., F2FS: A New File System for Flash Storage, 13th USENIX Conference on File and Storage Technologies, Feb. 2015, pp. 273-286.
Jaeho Kim et al., Towards SLO Complying SSDs Through OPS Isolation, 13th USENIX Conference on File and Storage Technologies, Feb. 2015, pp. 183-189.
2015 Non-Volatile Memories Workshop, The Multi-Streamed Solid-State Drive, 7 pages, Mar. 2015.

* cited by examiner

STORAGE DEVICE WRITING DATA ON THE BASIS OF STREAM

CROSS-REFERENCE TO RELATED APPLICATION

This application is based upon and claims the benefit of priority from U.S. Provisional Patent Application No. 62/142,937, filed Apr. 3, 2015, the entire contents of which are incorporated herein by reference.

FIELD OF THE INVENTION

This invention generally relates to data storage, and more particularly, to a storage device writing data on the basis of stream.

BACKGROUND OF THE INVENTION

A storage device typically includes a plurality of physical blocks for storing data, and upon receiving a write command from a host, writes data to one of the physical blocks that is designated for writing the data. One type of storage device writes the data according to a stream ID included in the write command. In such a storage device, one or more input blocks for writing data are prepared with respect to each stream ID, and write data associated with a certain stream ID is stored in a physical block associated with the stream ID. Also, write data not associated with the stream ID are stored in a physical block that is not associated with the stream ID. By storing data in accordance with the stream ID, type of data (or lifetime of data) stored in a physical block can be uniform, and as a result, it is possible to increase a probability that the data in the physical block can be erased without transferring part of the data to another physical block (i.e., garbage collection).

However, as the number of streams increases, physical blocks that are used for purposes other than the data writing, such as overprovisioning and garbage collection, decrease. As a result, latency of a response from the host may increase. Further, the number of physical blocks in which an end boundary of written data is not aligned with a boundary of the physical block may increase. In these physical blocks, reliability of the written data may decrease. Also, a write amplification factor (WAF) of the storage device may increase.

SUMMARY OF THE INVENTION

In general, according to an embodiment, a storage device includes a non-volatile semiconductor memory device including a plurality of physical blocks, and a controller configured to associate one of the physical blocks with a stream ID, receive a first command including the stream ID, and in response thereto, transmit information on capacity of unwritten space in the physical block associated with the stream ID.

Further, according to an embodiment, a computing device includes a processing unit programmed to carry out a method of issuing commands to store write data in a storage device having a non-volatile semiconductor memory device including a plurality of physical blocks. The method includes steps of issuing a first command including a stream ID, in response to the first command, receiving information on capacity of unwritten space in a physical block, which is currently mapped as an input block for storing data associated with the stream ID, if a size of the write data is greater than the capacity, issuing a second command to remap a physical block that is associated with no stream ID as a new input block, and if the size of the write data is not greater than the capacity, issuing a write command to write the write data into the currently-mapped input block.

DETAILED DESCRIPTION OF THE INVENTION

Figures 1, 2:
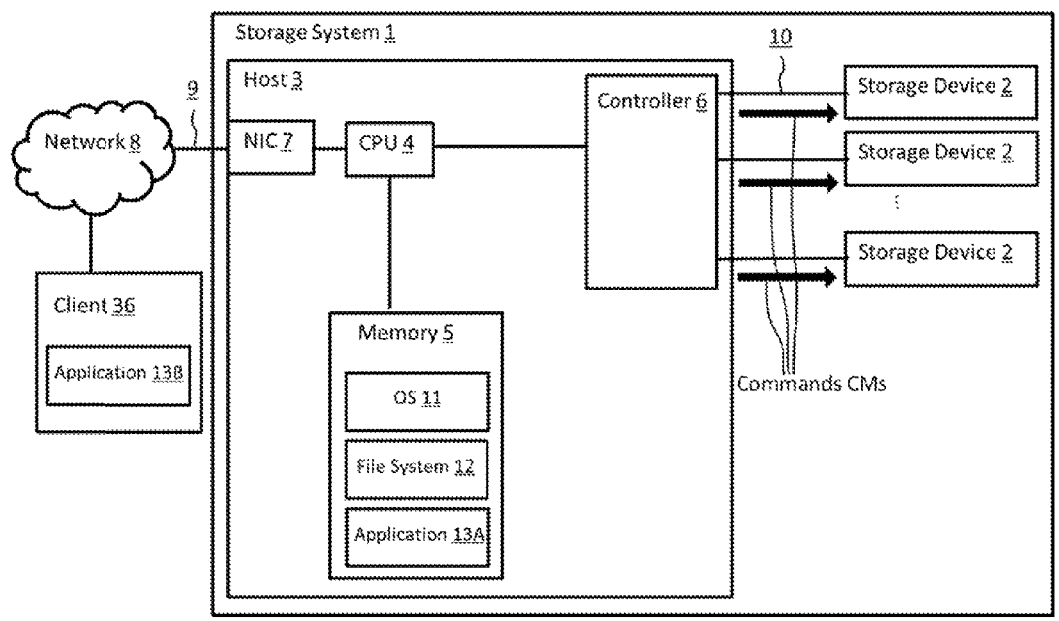
FIG. 1 illustrates a configuration of a storage system according to an embodiment.
FIG. 2 illustrates a software layer structure of the storage system according to the embodiment.

Details of the present disclosure are described below with reference to the drawings. FIG. 1 illustrates a configuration of a storage system 1 coupled to a client 36 via a network 8, according to an embodiment. The storage system 1 includes a host 3, one or more storage devices 2, and an interface 10 configured to connect the host 3 and each of the storage devices 2. In the present embodiment, the storage device 2 is, for example, an SSD (Solid State Drive), which is a nonvolatile storage device. Alternatively, the storage device 2 can be other storage devices such as a hard disk drive (HDD), a hybrid drive, an SD card, a USB memory, an embedded Multi Media Card (eMMC), and a storage device and a memory node described in U.S. Patent Application Publication No. 2012/0117354, the entire contents of which are incorporated by reference herein. Further, in the present embodiment, the interface 10 uses SAS (Serial Attached SCSI) protocol. Alternatively, the interface 10 can use any other technically feasible protocol, such as PCI Express (Peripheral Component Interconnect Express, PCIe), USB (Universal Serial Bus), SATA (Serial Advanced Technology Attachment), Thunderbolt®, Ethernet®, Fibre Channel, and the like.

The host 3 includes a CPU 4, a memory 5, a controller 6, and a Network Interface Controller (NIC) 7. The CPU (processing unit) 4 is a central processing unit of the host 3, and performs various calculations and control operations in the host 3. The CPU 4 and the controller 6 are connected by an interface using a protocol such as PCI Express. The CPU 4 performs control of storage device 2 via the controller 6. The controller 6 is an SAS expander in the present embodiment, and alternatively PCIe Switch, PCIe expander, RAID controller, JBOD controller, and the like may be used as the controller 6. The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to the network 8 via a network interface 9. The network interface 9 uses a protocol, for example, an Ethernet, InfiniBand, Fibre Channel, PCI Express Fabric, WiFi, and the like.

The memory 5 temporarily stores a program and data and functions as a working memory of the CPU 4. The memory 5 includes a memory area for storing the OS 11, a memory area for storing a file system 12, and a memory area for storing application software layer 13A. As is generally known, the OS 11 represents system software for managing the host 3, and may be a commodity OS such as Linux®, Windows®, Hyper-V, or a virtualization software available form VMware, Inc. The OS 11 operates to manage an input to and an output from the host 3, the storage devices 2, and the memory 5, and enable the software to use components in the storage system 1, including the storage devices 2. The file system driver 12 is used to manage data writing to the storage device 2 and data reading from the storage device 2. The file system 12 may be, for example, file ZFS, Btrfs, XFS, ext4, ReFS, and NTFS. Alternatively, the file system 12 may be an object storage system (such as Ceph Object Storage Daemon) and a key value store system (such as Rocks DB).

The host 3 sends, to the storage device 2 via the interface 10, a variety of commands CMs for various purposes, including data writing to and data reading from the storage device 2. The commands CM includes a write command, a read command, an unmap command, a Flush command, an Open Stream command, a Close Stream command, a Get Block Boundary Information (GBBI) command, a Select Next Input Block (SNIB) command, a Pend Current Input Block (PCIB) command, a Resume Input Block (RIB) command, a Get Pended Input Block Pool (GPIBP) command, a Release Pended Input Block Pool (RPIBP) command, and the like, as described below in detail referring to FIGS. 8-18.

In addition, the application software layers 13A and 13B (collectively 13) are loaded, respectively, in the memory 5 and the client device 36, which is connected to the storage system 1 through the network 8. FIG. 2 illustrates a structure of software layers in the storage system 1 according to the present embodiment. Usually, the application software layer 13 loaded in the memory 5 and/or the client 36 does not operate to directly communicate with the storage device 2 and instead operate to communicate with the storage device 2 through the OS 11 loaded in the memory 5. Further, the OS 11 operates to communicate with the storage device 2 through the file system 12 loaded in the memory 5. When the application software layer 13 operates to transmit to the storage device 2 a request, such as a read request or a write request, which is initiated by the host 3 and/or the client device 36, the application software layer 13 first operates to transmit a request to the OS 11, and then the OS 11 operates to transmit a request to the file system 12. The file system 12 operates to specify one or more logical addresses (LBA: Logical Block Address) of the storage device 2 corresponding to the request, and then operates to transmit a command, the one or more LBAs, and data associated with the one or more LBAs, to the storage device 2 via the interface 10. Upon receiving a response from the storage device 2, the file system 12 operates to transmit a response to the OS 11, and then the OS 11 operates to transmit a response to the application software layer 13.

When the application 13 is executed, a number of application software threads 39 may run. The application software threads 39 includes, for example, client software, database software (e.g., Cassandra D B, Mongo D B, HBASE, and etc.), Distributed Storage System (Ceph etc.), Virtual Machine (VM), guest OS, and Analytics Software (e.g., Hadoop, R, and etc.).

Figure 3:
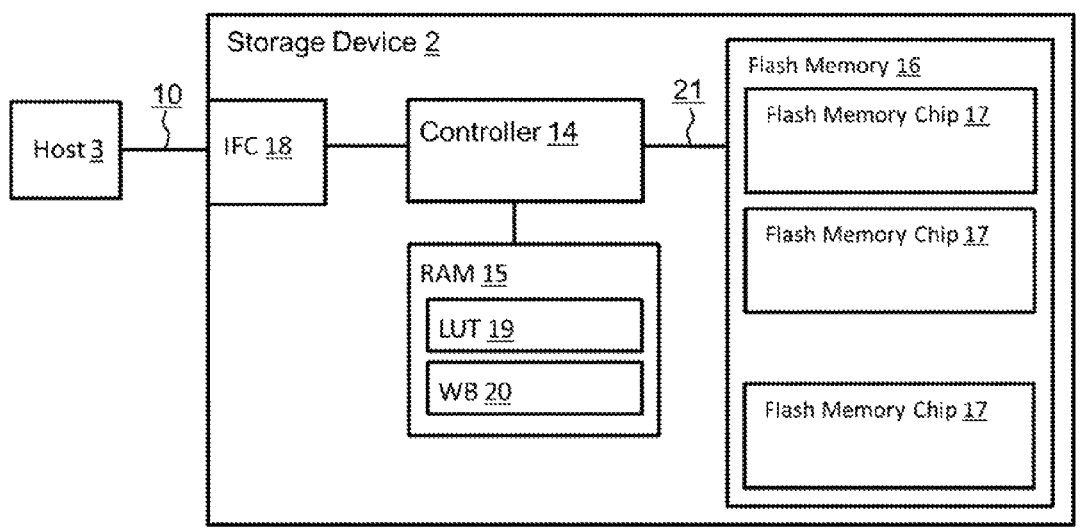
FIG. 3 illustrates a configuration of a storage device in the storage system according to the present embodiment.

FIG. 3 illustrates a configuration of the storage device 2 according to the present embodiment. The storage device 2 functions as an SSD, and includes a controller 14, a random access memory (RAM) 15, a non-volatile semiconductor memory, such as a NAND flash memory 16 (hereinafter flash memory), and an interface controller (IFC) 18. The IFC 18 is configured to perform transmission and reception of signals to and from the host 3 via the interface 10. The RAM 15 functions as a semiconductor memory, and includes a memory region for storing a look-up table (LUT) 19 that is used to manage mappings between LBAs and physical addresses of the flash memory 16 and a write buffer (WB) 20. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21, such as Toggle and ONFI.

Figure 4:
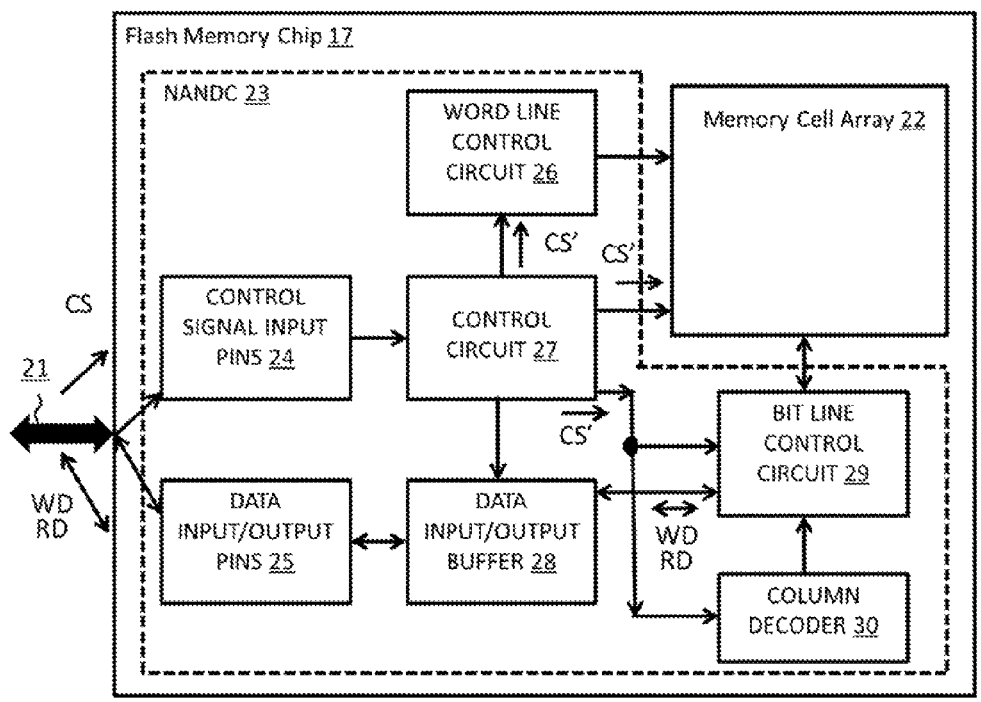
FIG. 4 illustrates a configuration of a flash memory chip in a flash memory of the storage device.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each storing data, as described below in detail. The NANDC 23 is a controller configured to control access to the memory cell array 22.

Specifically, the NANDC 23 includes control signal input pins 24, data input/output pins 25, a word line control circuit 26, a control circuit 27, a data input/output buffer 28, a bit line control circuit 29, and a column decoder 30. The control circuit 27 is connected to the control signal input pins 24, the word line control circuit 26, the data input/output buffer 28, the bit line control circuit 29, and the column decoder 30, and controls circuit components of the NANDC 23. Also, the memory cell array 22 is connected to the word line control circuit 26, the control circuit 27, and the data input/output buffer 28. Further, the control signal input pins 24 and the data input/output pins 25 are connected to the controller 14 of the storage device 2, through the flash interface 21.

When data are read from the flash memory chip 17, data in the memory cell array 22 (read data RD) are output to the bit line control circuit 29 and then temporarily stored in the data input/output buffer 28. Then, the read data RD are transferred to the controller 14 of the storage device 2 from the data input/output pins 25 through the flash interface 21. When data are written into the flash memory chip 17, data to be written (write data WD) are input to the data input/output buffer 28 through the data input/output pins 25. Then, the write data WD are transferred to the column decoder 30 through the control circuit 27, and input to the bit line control circuit 29 by the column decoder 30. The write data WD are written into memory cells of the memory cell array 22 at a timing controlled by the word line control circuit 26 and the bit line control circuit 29.

When control signals CS are input to the flash memory chip 17 from the controller 14 of the storage device 2 through the flash interface 21, the control signals CS are input through the control signal input pins 24 into the control circuit 27. Then, the control circuit 27 generates control signals CS', according to the control signals CS from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
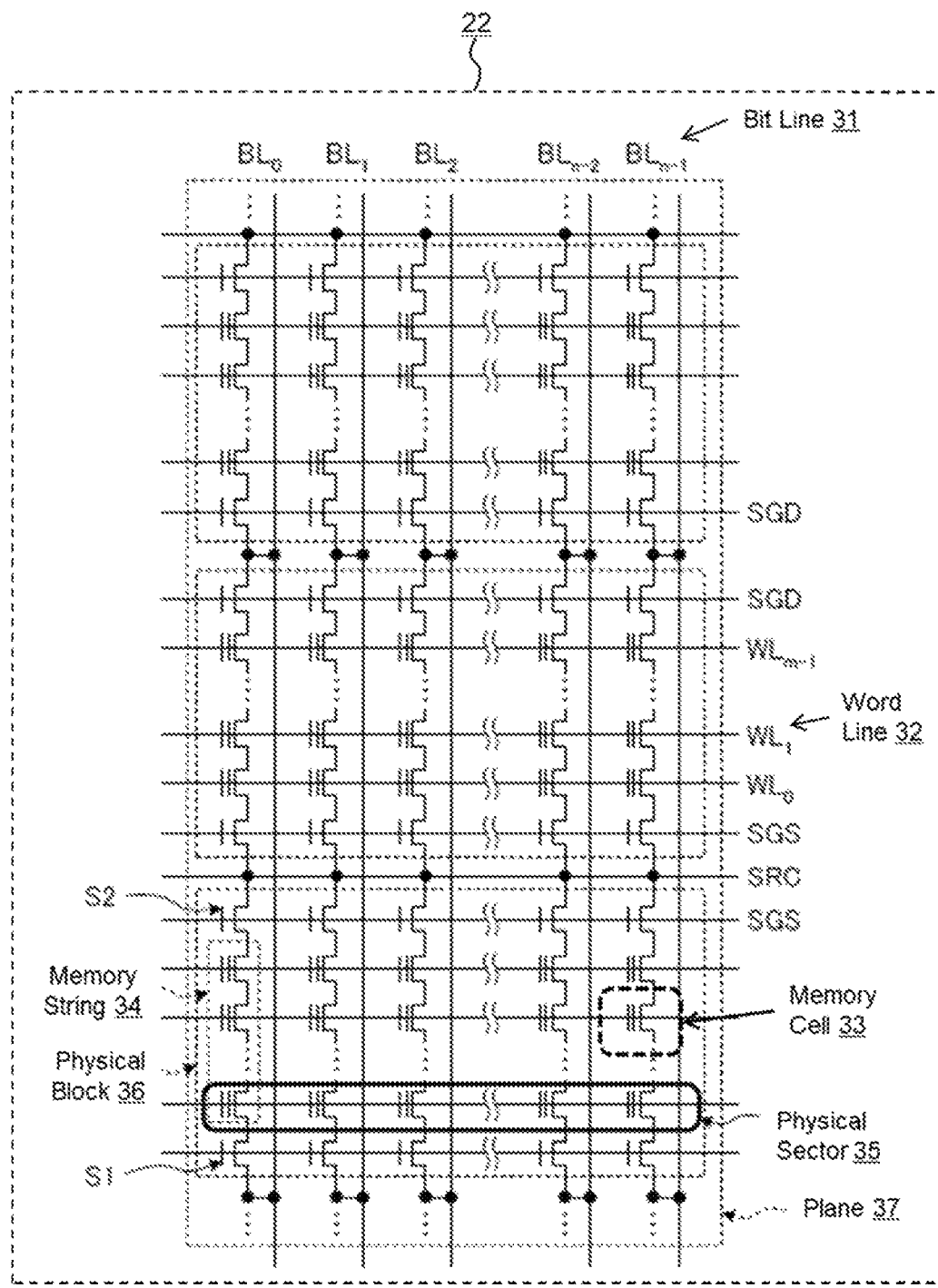
FIG. 5 illustrates detailed circuit structure of a memory cell array in the flash memory chip.

FIG. 5 illustrates a detailed circuit structure of the memory cell array 22. The memory cell array 22 includes one or more planes 37, each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines 32. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each memory string (MS) 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm-1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and a physical block address. A physical page address is assigned to each of the physical pages, and a physical block address is assigned to each of the physical blocks 36.

Figure 6:
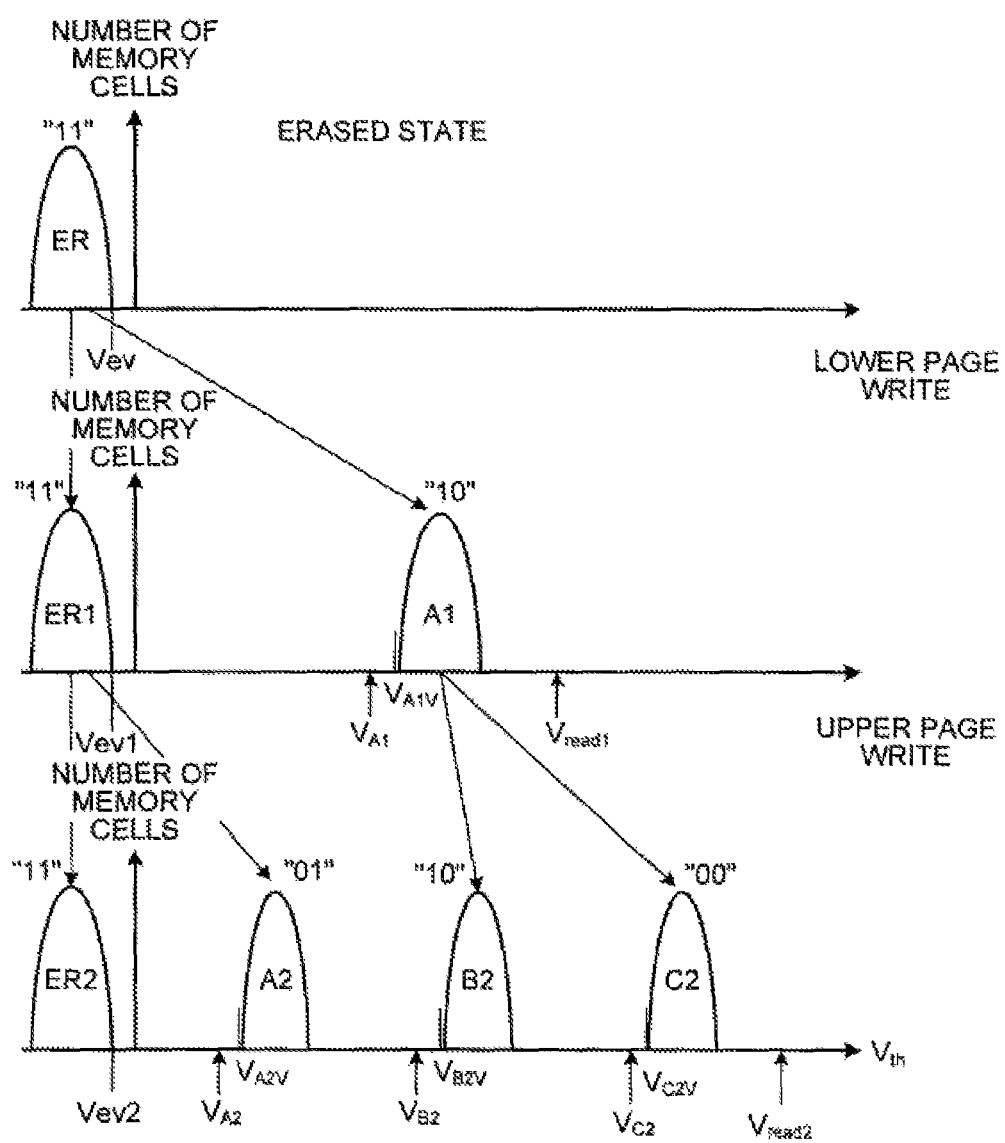
FIG. 6 illustrates a relation between 2-bit four-level data stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, e.g., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data by varying the threshold voltage thereof.

In the present embodiment, each of the memory cells 33 employs a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, U.S. Patent Application Publication No. 2010/0207195, and U.S. Patent Application Publication No. 2010/0254191, the entire contents of all of which are incorporated by reference herein.

Figure 7:
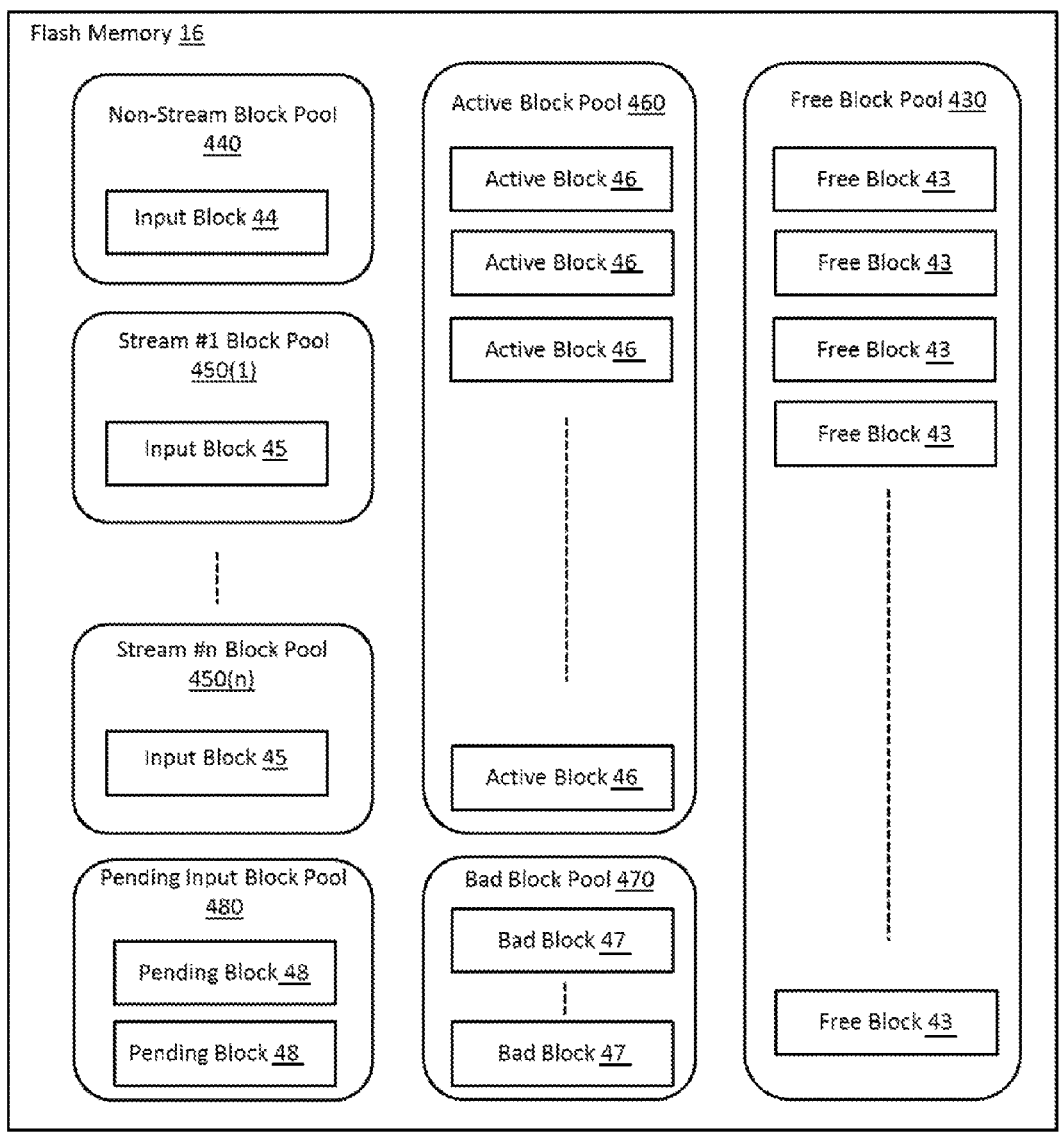
FIG. 7 illustrates an overview of the mapping of the physical blocks based on block pools.

According to the present embodiment, the controller 14 of the storage device 2 manages the physical blocks 36 of the flash memory 16, by logically mapping the block in one of block pools, using the LUT 19 (shown in FIG. 3). FIG. 7 illustrates an overview of the mapping of the physical blocks based on block pools. The block pools here includes a free block pool 430, non-stream block pools 440, stream block pools 450(1)-450(n), an active block pool 460, a bad block pool 470, and a pending input block pool 480. The controller 14 maps each of the physical blocks 36, in the LUT 19, based on whether or not data are stored in the block and a type of data stored in the block, if any.

When no data are stored in a block, then the controller 14 maps the block as a free block 43 and maps the free block 43 in the free block pool 430. Also, when all data in a block are invalid data, the controller 14 maps the block as a free block 43 and maps the free block 43 in the free block pool 430. That is, free blocks 43 in the free block pool 430 are physical blocks that do not store data and physical blocks that store only invalid data. When the block has a space in which write data are supposed to be written, then the controller 14 maps the block as an input block 44(45) and maps the input block 44(45) in the non-stream block pool 440 or the stream block pool 450. That is, input blocks 44 and 45 are partially-written physical blocks where the controller 14 can write data without erasing it. In other words, there is unwritten space in the input blocks 44 and 45. When the input block 44(45) becomes full, then the controller 14 remaps the input block 44(45) as an active block 46 and maps the active block 46 in the active block pool 460. That is, active blocks 46 are physical blocks that store valid data. When a block is defective, then the controller 14 maps the defective block as a bad block 47 and maps the bad block 47 in the bad block pool 470. That is, bad blocks 47 are physical blocks that are no longer usable for storing data. When an input block 45(44) is set aside and not used for data writing temporarily, then the controller 14 maps the input block 45(44) as a pending block 48, and maps the pending block 48 in the pending input block pool 480. That is, the pending input blocks 48 are physical blocks that are temporarily set aside as blocks that are not available for data writing.

In such a manner, the LUT 19 (shown in FIG. 3) is used to manage a physical block address list of the free blocks 43, the input blocks 44 and 45, the active blocks 46, the bad blocks 47, and the pending blocks 48, respectively. Here, another type of a block pool may be also managed in the LUT 19.

Here, according to the present embodiment, the block pools include stream block pools 450(1)-450(n), and in each of the stream block pools 450(1)-450(n), a different one of input blocks 45 is mapped. Further, each of the input blocks 45 is associated with a different stream identification code (stream ID). When write data WD are associated with a particular stream ID, then the write data WD are input in one of the input blocks 45 that is associated with the particular stream ID. Thus, in order to write the write data WD associated with the particular stream ID, an input block associated with the particular stream ID has to be mapped. In other words, a stream having the particular stream ID has to be opened.

Figure 8:
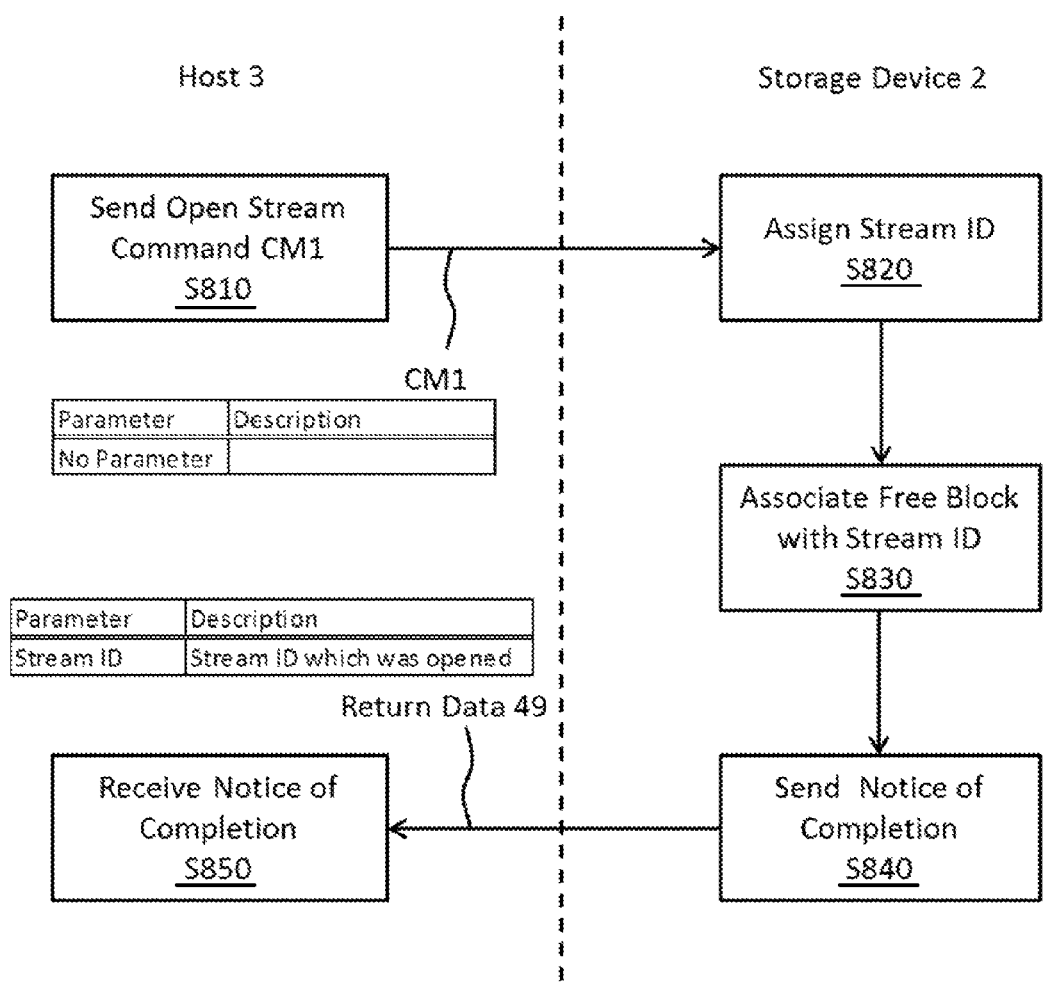
FIG. 8 illustrates a flow of an operation to open a new stream, which is carried out in the storage system.
Figure 9:
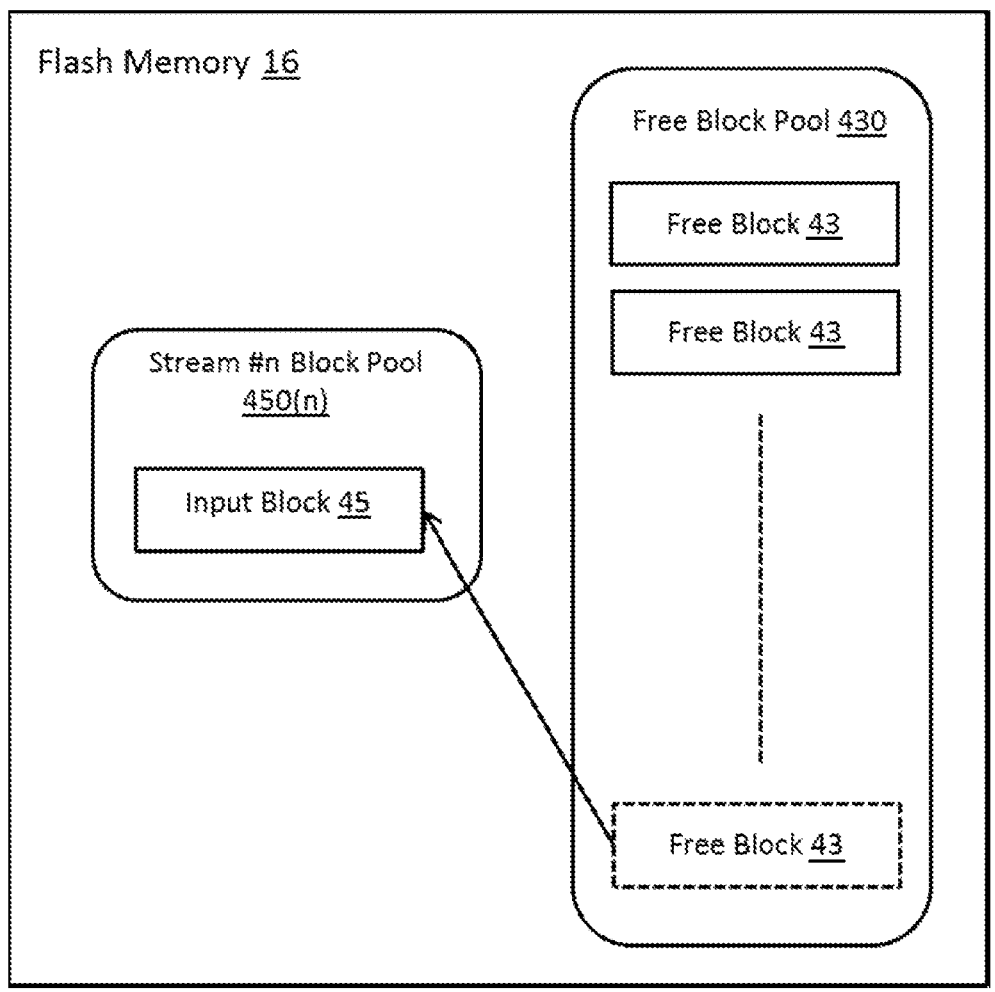
FIG. 9 schematically illustrates a step to open a new stream.

FIG. 8 illustrates a flow of an operation to open a new stream, which is carried out in the storage system 1. As shown, first, at Step S810, the host 3 transmits an Open Stream command CM1 to the storage device 2. Here, although the Open Stream command CM1 has no parameter, which is an additional data attached to the command, the Open Stream command CM1 may have one or more parameters. When the storage device 2 receives the Open Stream command CM1, the controller 14 of the storage device 2 assigns a stream ID for mapping at Step S820. Then, the controller 14 generates a new input block pool 450 in the LUT 19 associated with the assigned stream ID, associates a free block 43 in the free block pool 430 with the assigned stream ID, and remaps (re-categorizes) the free block 43 as an input block 45 in the stream block pool 450(n) corresponding to the assigned stream ID, at Step S830. FIG. 9 schematically illustrates Step S830. Thereafter, the storage device 2 notifies the host 3 of the assigned stream ID, by sending to the host 3 return data 49 at Step S840. Here, the return data 49 include, as a parameter, the stream ID of the newly-opened stream. When the host 3 receives the return data 49 from the storage device 2 at Step S850, the operation to open a new stream ends.

Figure 10:
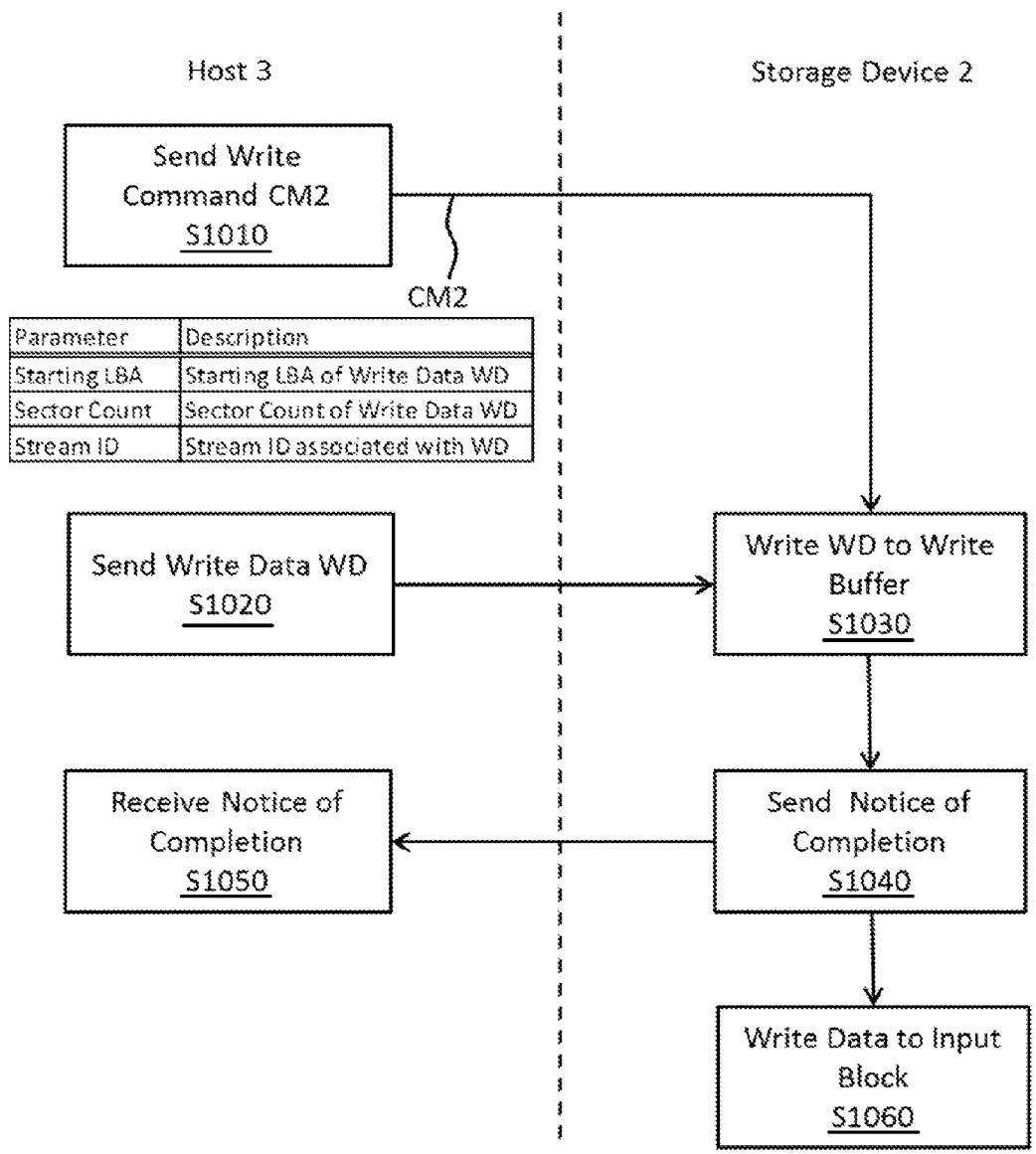
FIG. 10 illustrates a flow of a data writing operation carried out in the storage system.

After a stream is opened, that is, after an input block 45 associated with an stream ID is prepared, write data WD associated with the stream ID can be written in the input block 45. FIG. 10 illustrates a flow of a data writing operation carried out in the storage system 1. When the data writing operation is carried out, the host 3 transmits a write command (write request) CM2 to the storage device 2 via the interface 10 at Step S1010.

When the host 3 transmits the write command CM2 to the storage device 2, the host 3 includes a logical address in the write command CM2. In the present embodiment, the logical address is LBA, but may be Object ID or Object Key, instead of LBA. The LBA is a logical address in which serial numbers are given to logical sectors (size: e.g., 512 Bytes) starting from 0. Thus, when the host 3 issues the write command CM2 to the storage device 2, the host 3 transmits the write command CM2, including a LBA (a starting LBA of the write data), and logical sector count (data size) for which the write command CM2 is issued.

In other words, the write command CM2 includes parameters of a starting LBA and a sector count of the write data WD. Then, the host 3 transmits the write data WD to the storage device 2 at Step S1020. After the storage device 2 receives the write command CM2 and the write data WD, then the controller 14 of the storage device 2 stores the write data WD in the write buffer (WB) 20 at Step S1030. Then, at Step S1040, the controller 14 sends a notice of completion to the host 3. At Step S1050, the host 3 receives the notice of completion from the storage device 2, and the data writing operation on the side of the host 3 ends.

Subsequently, the controller 14 writes the write data WD stored in the WB 20 into a portion of the flash memory 16 located at physical addresses corresponding to the LBA included in the write command CM2, by referring to the LUT 19, at Step S1060. The mapping between the LBAs and the physical addresses are dynamic, so the mapping may be updated according to data management in the storage device 2.

Figure 11:
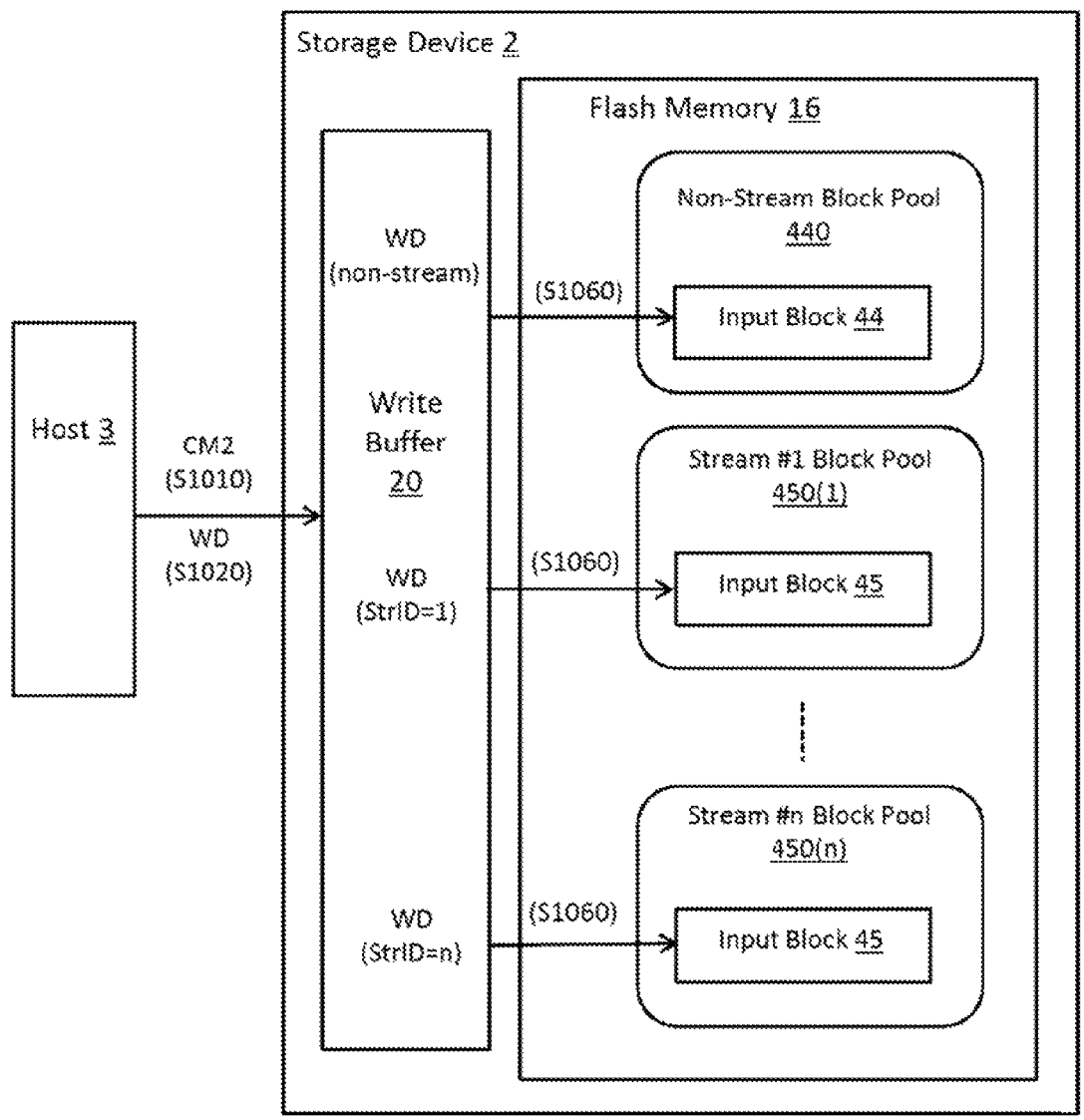
FIG. 11 schematically illustrates the data writing operation.

In the present embodiment, the data writing operation of the write data WD from the write buffer 20 to the physical block of the flash memory 16 is carried out according to a stream ID, which is also included in the write command CM2, as a parameter. FIG. 11 schematically illustrates the data writing operation based on a stream ID included in the write command CM2. As shown, the write data WD are written into a physical block of the flash memory 16 that is mapped as an input block 45 associated with the stream ID in the write command CM2. In some cases, the write command CM2 may not include the stream ID, and in such a case, the controller 14 write the write data WD in the input block 44 in the non-stream block pool 440, which is not associated with any stream ID. When the storage device 2 writes the write data WD in the physical block of the flash memory 16 at Step S1060, the data writing operation on the side of the storage device 2 ends.

Figure 12:
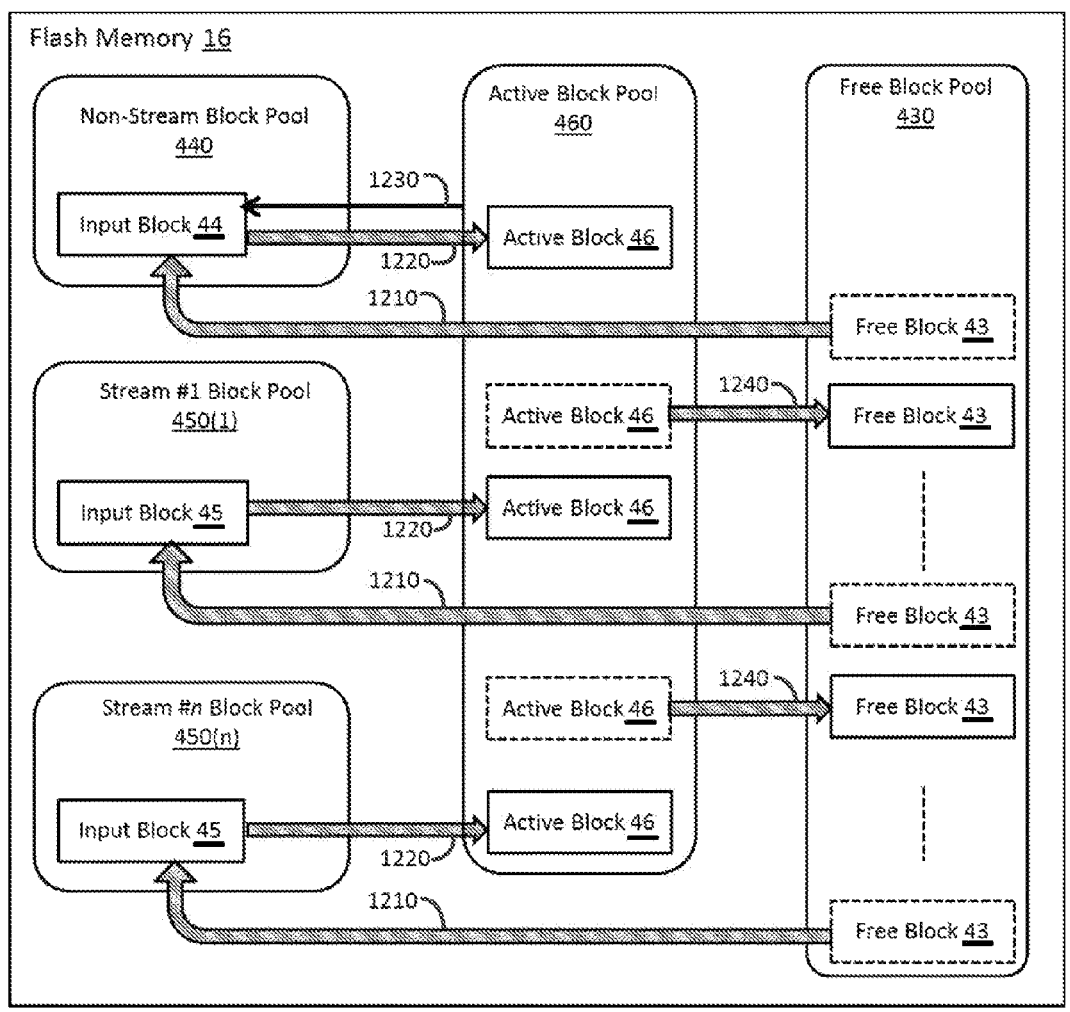
FIG. 12 schematically illustrates remapping of physical blocks.

There are some circumstances where the physical blocks of the flash memory 16 are remapped as a different block. FIG. 12 schematically illustrates remapping of physical blocks. As shown by arrows 1210, when there is no available input block 45 associated with a stream ID in the flash memory 16, the controller 14 remaps (allocates) a free block 43 in the free block pool 430 as a new input block 45 associated with the stream ID. As shown by arrows 1220, when no physical page in an input block 45 is available for data writing without erasing written data, the controller 14 remaps (moves) the input block 45 as an active block 46 in the active block pool 460. When there is not an enough amount of free blocks 43 in the free block pool 430, the controller 14 carries out garbage collection with respect to the active blocks 46 in the active block pool 460. During the garbage collection, as shown by an arrow 1230, the controller 14 of the storage device 2 copies valid data in active blocks 46 that undergo the garbage collection in the active block pool 460 and transfers the copied valid data into an input block 44 in the non-stream block pool 440. Further, during the garbage collection, as shown by arrows 1240, the controller 14 remaps the active blocks 46 from which valid data has been transferred, as free blocks 43. After the invalid data in the free blocks 43 are erased, the free blocks 43 can be used for new data writing.

Figure 13:
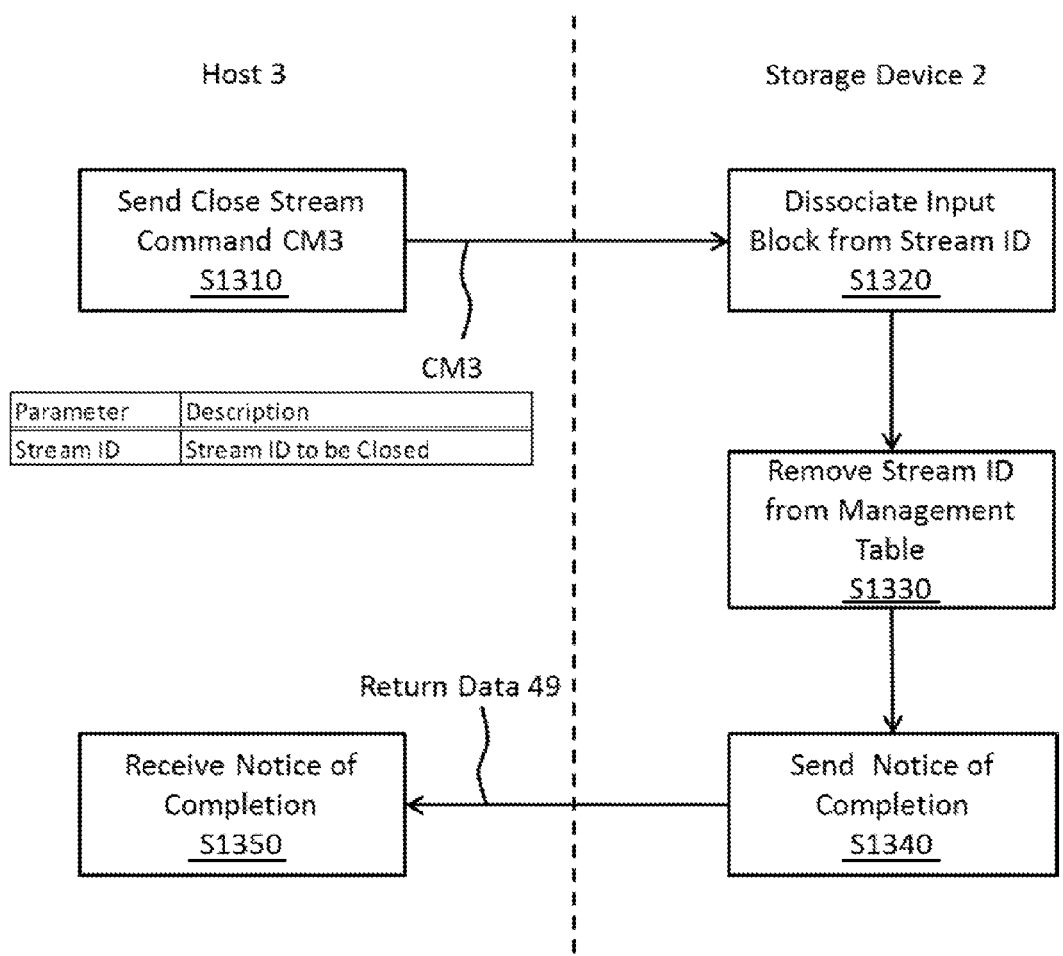
FIG. 13 illustrates a flow of an operation to close a stream, which is carried out in the storage system.
Figure 14:
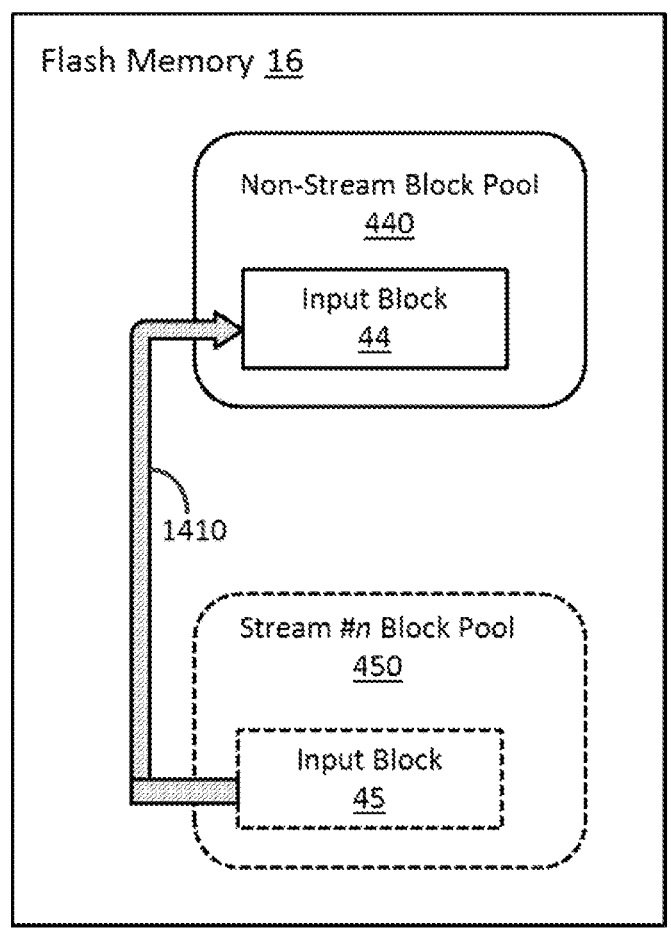
FIG. 14 schematically illustrates a step to dissociate input block from a stream ID.

When a stream is no longer used, the stream can be closed. FIG. 13 illustrates a flow of an operation to close a stream, which is carried out in the storage system 1. First, the host 3 transmits a Close Stream command CM3, including a stream ID to be closed as a parameter, to the storage device 2 at Step S1310. When the storage device 2 receives the Close Stream command CM3, at Step S1320, the controller 14 of the storage device 2 remaps the input blocks 45 associated with the stream ID included in the Close Stream command CM3, as the input blocks 44 with which no stream ID is associated and maps the input blocks 44 in the non-stream block pool 440. FIG. 14 schematically illustrates Step S1320 by an arrow 1410. Further, at Step 1330, the controller 14 removes the stream ID from a table (not shown) storing relationship between physical block addresses and stream IDs, which have been opened previously. Then, at Step S1340, the storage device 2 notifies the host 3 of completion of the closing stream operation. When the host 3 receives the notice of completion from the storage device 2 at Step S1350, the operation to close the stream ends.

Figure 15:
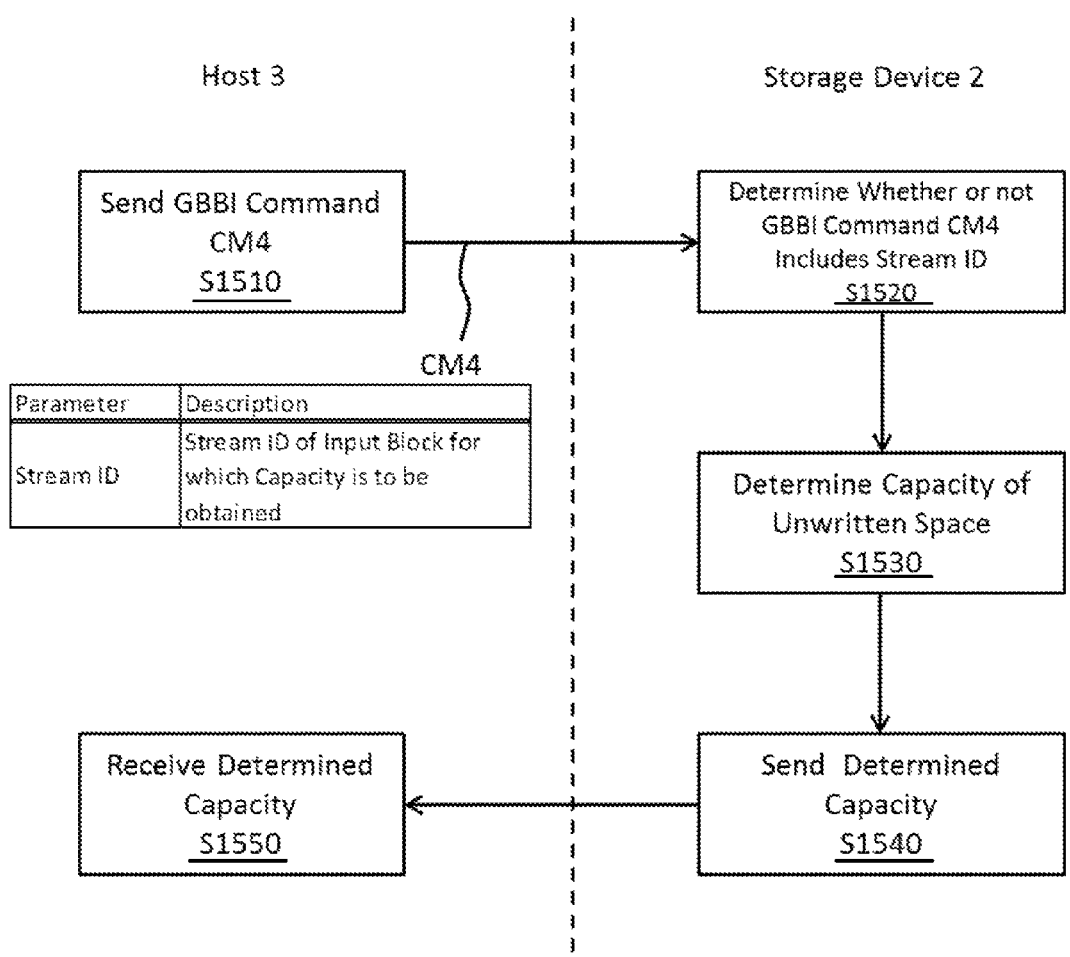
FIG. 15 illustrates a flow of an operation for the host to obtain a capacity of an unwritten space in an input block.

According to the present embodiment, the host 3 is further configured to carry out an operation to obtain a capacity of unwritten space in one of the input blocks 45(44) for various purposes. FIG. 15 illustrates a flow of an operation for the host 3 to obtain a capacity of unwritten space in an input block 45(44). First, at Step S1510, the host 3 transmits a Get Block Boundary Info (GBBI) command CM4. The GBBI command CM4 may or may not include a stream ID. When the storage device 2 receives the GBBI command CM4, at Step S1520, the controller 14 of the storage device 2 determines whether or not the GBBI command CM4 includes a stream ID, and, if the GBBI command CM4 is determined to include a stream ID, then the controller 14 determines (calculates) a capacity of an unwritten space in the input block 45 associated with the stream ID at Step S1530. Then, the controller 14 notifies the host 3 of the capacity at Step S1540, which the host 3 receives at Step S1550. If the GBBI command CM4 is determined to not include a stream ID, then the controller 14 determines (calculates) a capacity of an unwritten space in the input block 44 that is not associated with any stream ID at Step S1530. Then the controller 14 notifies the host 3 of the capacity at Step S1540, which the host 3 receives at Step S1550. As a result, the host 3 can recognize the unwritten space in the input block 45 associated with a stream ID (or the input block 44 not associated with a stream ID). This operation is typically carried out before the host 3 sends to the storage device 2 the write data WD. As the write data WD can be written to one input block 45(44), instead of a plurality of input blocks (i.e., the current input block and a new input block), it is possible to avoid data fragmentation of the write data WD.

Figure 16:
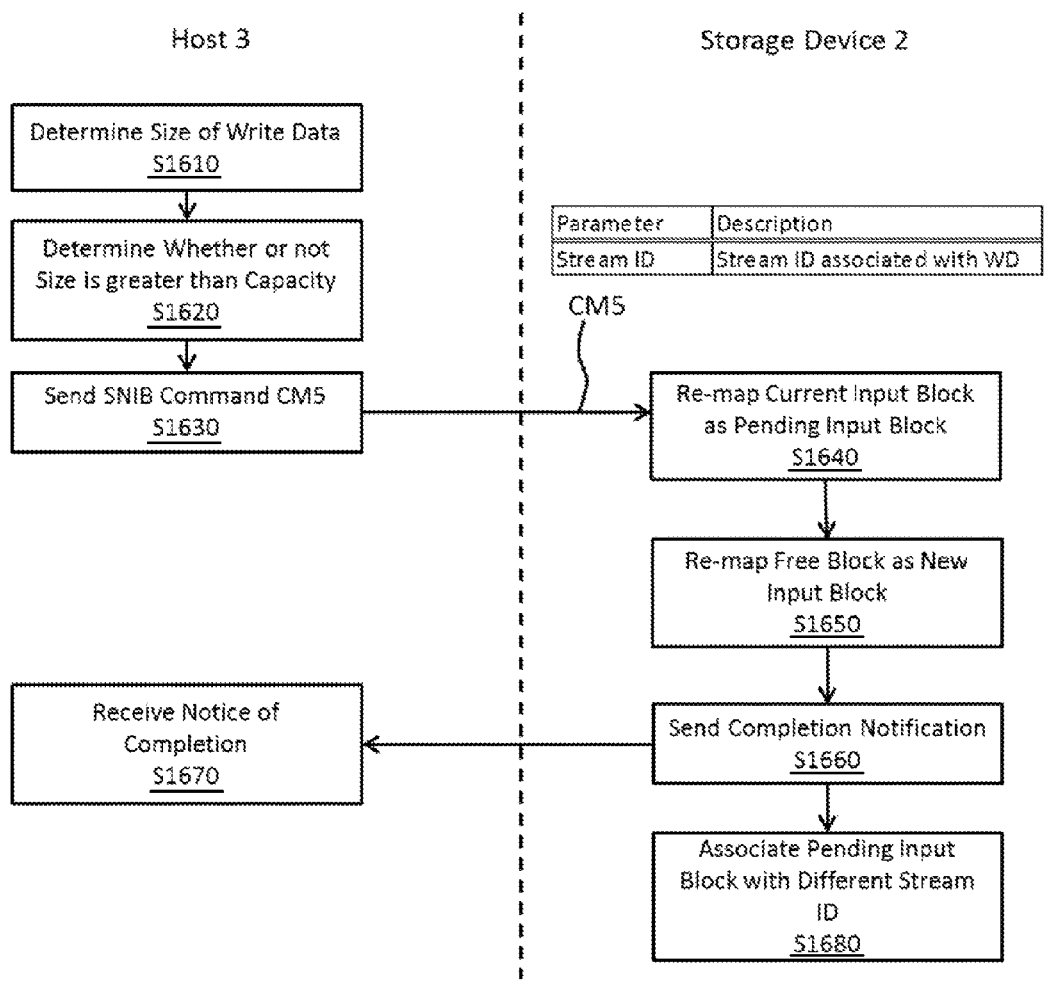
FIG. 16 illustrates a flow of an operation to set aside the current input block in a stream block pool as a pending input block in the pending input block pool.

After the operation to obtain the capacity of unwritten space in an input block 45(44), the storage system 1 further can carries out an operation to set aside a current input block 45(44) in a stream block pool 450(440) as a pending input block 48 in the pending input block pool 480. FIG. 16 illustrates a flow of an operation to set aside the current input block 450 (440) in a stream block pool 450 (440) as a pending input block 48 in the pending input block pool 480. This operation is typically carried out before the host 3 transmits the write command CM2 to the storage device 2 (i.e., before Write Operation), so as to insure that the input block 45(44) has sufficient unwritten space for the write data WD to be written next.

When the operation to set aside a current input block is carried out, at Step S1610, the host 3 determines a size of the write data WD to be written in an input block 45 associated with a stream ID. Then, at Step S1620, the host 3 compares the size of the write data WD with capacity of the unwritten space in the input block 45 associated with the same stream ID and determines whether or not the size of the write data WD is greater than the capacity of the unwritten space in the current input block 45. When the size of the write data WD is determined to be greater than the capacity of the unwritten space, at Step S1630, the host 3 transmits a Select Next Input Block (SNIB) command CM5 to the storage device 2. By contrast, when the size of the write data WD is determined to be equal to or smaller than the unwritten space in the current input block 45, then the host 3 does not transmit the SNIB command CM5 to the storage device 2 and the process ends. The SNIB command CM5 may or may not include a stream ID.

Figure 17:
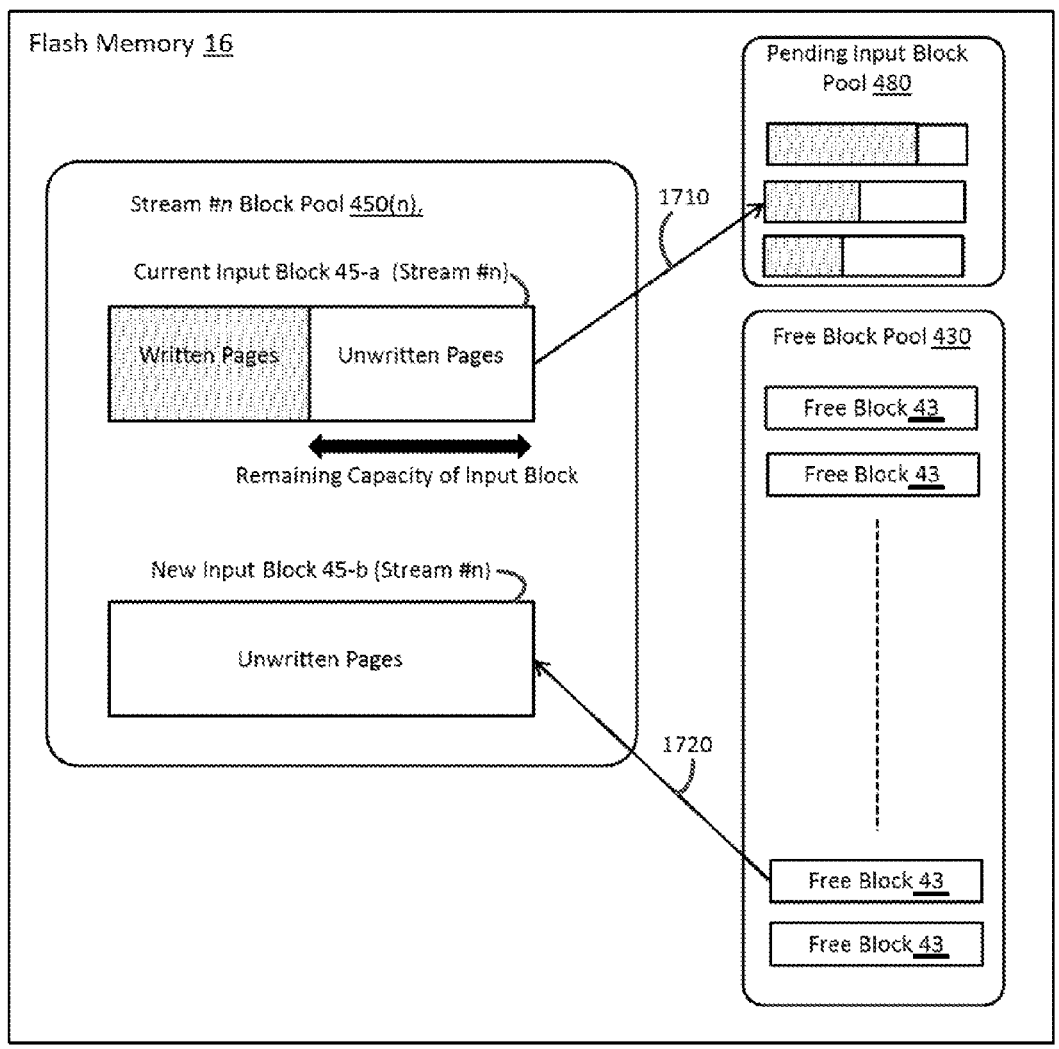
FIG. 17 schematically illustrates remapping of a current input block as a pending input block and a free block as a new input block.

When the storage device 2 receives the SNIB command CM5, the controller 14 of the storage device 2 determines whether or not the SNIB command CM5 includes a stream ID. At Step S1640, if the SNIB command CM5 is determined to include a stream ID, then the controller 14 remaps the current input block 45 as a pending input block 48 in the pending input block pool 480. If the SNIB command CM5 is determined to not include a stream ID, the controller 14 remaps the input block 44 as a pending input block 48, in a similar manner. FIG. 17 schematically illustrates the remapping of a current input block 45 as a pending input block 48 in the pending input block pool 480. As shown by an arrow 1710, a current input block 45—a in a stream block pool 450(*n*) is remapped as a pending input block 48 in the pending input block pool 480.

Before the controller 14 remaps the current input block 45 as the pending input block, the controller 14 may write dummy data, which have a size of a plurality of pages, to the current input block 45. As last data written to the current input block 45 may become unreliable if the current input block 45 is set aside as the pending input block 48 without being full, the dummy data, which does not contain any useful data, are written as last data in the current input block 45 before being pooled into the pending input block pool 480.

Further, at Step S1650, the controller 14 remaps a free block 43 in the free block pool 430 as a new input block 45. FIG. 17 also illustrates the remapping of the free block 43 as a new input block 45-*b* by an arrow 1720. At this time, the capacity of the new input block 45 may or may not be greater than the size of the write data WD, if the capacity of the free block 43 is fixed. In that case, another new input block 45 may be prepared from another free block 43 in the free block pool 430. That is, a plurality of new input blocks 45 may be prepared for writing the write data WD. If the capacity of the free blocks 43 in the free block pool 430 is variable, then a free block 43 having capacity greater than the write data WD may be suitably selected. In that case, the SNIB command CM5 may include, as a parameter, the size of the write data WD, and the controller 14 may recognize the size of the write data WD and prepare a new input block 45 having capacity greater than the size of the write data WD. Here, the order of the steps S1640 and S1650 may be reversed. After the new input block 45 is prepared, the storage device 2 notifies the host 3 of completion of the operation to set aside a current input block 45 at Step S1660. When the host 3 receives the notice of completion from the storage device 2, the operation to set aside a current input block 45 on the side of the host 3 ends.

At some point of time, after the storage device 2 sets asides the current input block 45 and pooled in the pending input block pool 480, in response to receiving the SNIB command CM5, the controller 14 remaps the pending input block 48 as an input block 45 associated with a different stream ID or not associated with any stream ID at Step 1680.

Figure 18:
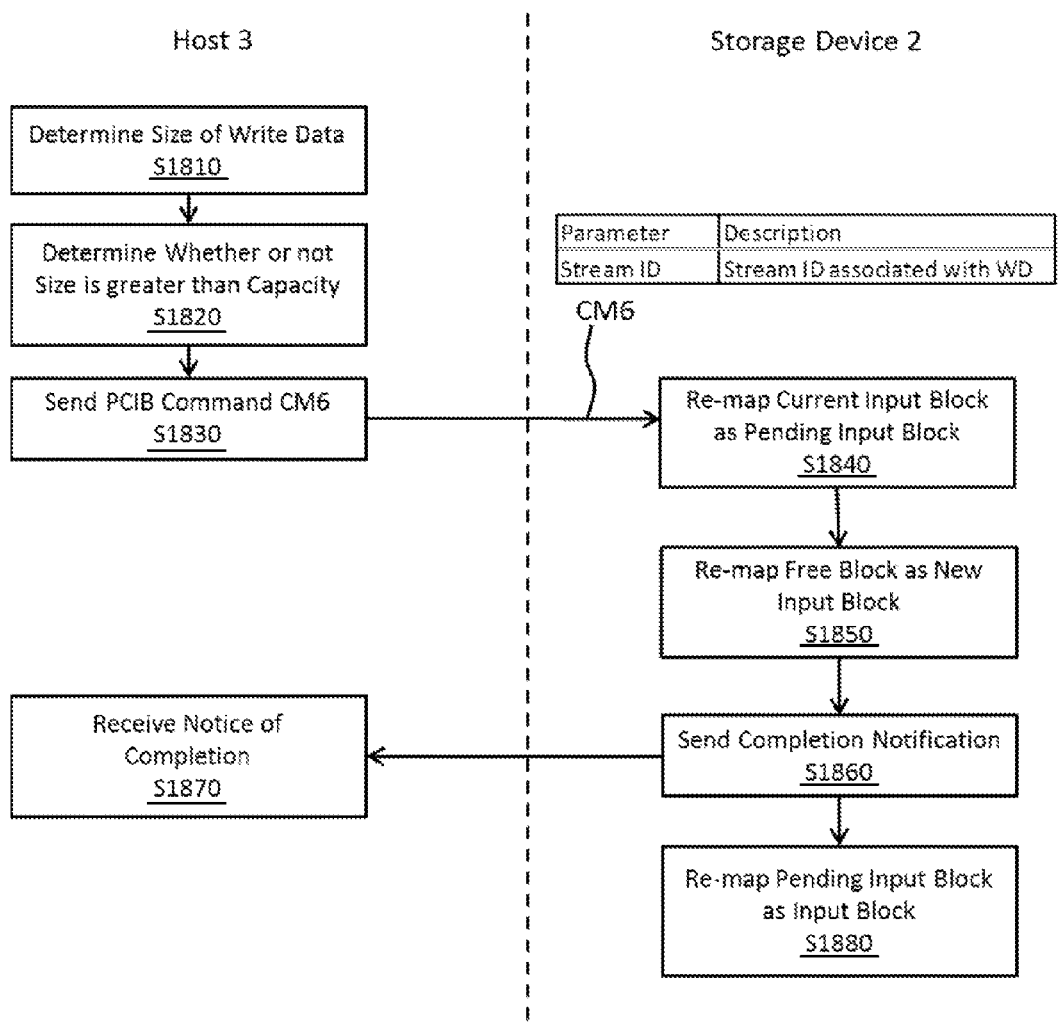
FIG. 18 illustrates a flow of another operation to set aside the current input block in a stream block pool as a pending input block in the pending input block pool.

Besides the operation to obtain the capacity of the unwritten space in an input block, there is another operation to set aside a current input block 45 as a pending input block 48 in the pending input block pool 480. FIG. 18 illustrates a flow of the operation to set aside the current input block 45(44) in the stream block pool 450 (440) as the pending input block 48 in the pending input block pool 480. This operation is carried out using a Pend Current Input Block (PCIB) command CM6. The operation to set aside the current input block 45 and allocate a new input block 45 is substantially the same as the above operation carried out using the SNIB command CM5. That is, operational steps S1810-S1870 (except for S1880) are substantially the same as the operational steps S1610-S1670 in FIG. 16. According to the operation illustrated in FIG. 18, at Step S1880, the pending input block 48 is automatically remapped as the input blocks 45 associated with the same stream ID when the new input block 45 becomes full, and then the operation ends.

In addition, the PCIB command CM6 may include, as a parameter, a source stream ID, which is a stream ID different from a stream ID associated with the write command CM2 to be sent. When the PCIB command CM6 includes the source stream ID, an input block 45 associated with the source stream ID, instead of the free block 43 in the free block pool 430, is remapped as the new input block 45. In this case, if the new input block 45 becomes full, the pending input block 48 may be automatically remapped as the input block 45 associated with the stream ID tied to the write data WD. That is, the original input block 45 is set as a new input block 45 of the same stream ID after temporarily being set aside as the pending input block 48.

In the present embodiment, the host 3 can use either the SNIB command CM5 or the PCIB command CM6 to set aside the physical block currently set as the input block 45 as the pending input block 48 in the pending input block pool 480. For example, when the size of the new input block 45 is not sufficient to store the write data WD and the current input block 45 can store a portion of the write data WD that cannot be stored in the new input block 45, the host 3 may suitably use the PCIB command CM6, instead of the SNIB command CM5.

In addition to the above-described commands, the host 3 can send to the storage device 2 a Resume Input Block (RIB) command CM7, a Get Pended Input Block Pool (GPIBP) command CM8, and a Release Pended Input Block Pool (RPIBP) command CM9.

The RIB command CM7 is generated by the host 3 to force the storage device 2 to resume using the pending input block 48 as the input block 45 again (even if a current input block is not full). When the RIB command CM7 is generated, a new input block 45-*b* used at the time when the RIB command CM7 is generated may be remapped as a pending input block 48 or an input block 45 associated with another stream ID. The RIB command CM7 may be generated, for example, while the write data WD are being written in the new input block 45-*b*. When a size of the remaining write data equals to the capacity of the unwritten space in the pending input block 48, the RIB command CM7 can be preferably generated.

The GPIBP command CM8 is generated by the host 3 to acquire a capacity of the unwritten space of the pending input block 48 in the pending input block pool 480. The RPIBP command CM9 is generated by the host 3 to disassociate the pending input block 48 in the pending input block pool 480 from the stream ID. The disassociated pending input block is not associated with any of open stream IDs, and write data WD not associated with any stream IDs may be written thereto.

As the foregoing illustrates, according to the present embodiment, a host can acquire a capacity of unwritten space in a physical block of a storage device set as an input block by sending a command (the GBBI command) to the storage device. As the host can recognize the capacity, the host can determine whether or not the physical block currently set as the input block is a suitable block for writing data. If the physical block set as the input block is not suitable for writing the data, the host further can send a secondary command (the SNIB command or the PCIB command) that causes the storage device to replace the current input block with another physical block that is more suitable to write the data. Also, through the secondary command, the host can set aside the physical block currently set as the input block as a pending input block into which the data are not to be written. This pending input block can be later used as an input block for the stream, a different stream, or non-stream block.

According to the above embodiment, the storage system can select a physical block suitable for writing data in terms of capacity. Since data can be written into fewer blocks with less data fragmentation, such data can be read more quickly and with fewer processes. Further, since the data are written based on the streams, written data can be physically sorted according a type of data, size of data, attributes of data, and so on, which can lead to less data fragmentation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
a non-volatile semiconductor memory device including a plurality of physical blocks; and
a controller configured to associate one of the physical blocks with a stream ID, receive a first command including the stream ID, and in response thereto, transmit information on capacity of unwritten space in the physical block associated with the stream ID, wherein
when the controller receives a second command including the stream ID after the first command, the controller is further configured to remap a physical block that is currently associated with no stream ID, as a new input block for storing data associated with the stream ID, and
the second command is a command different from a write command and different from a read command.

2. The storage device according to claim 1, wherein
the controller is configured to erase all data in the physical block before the physical block is remapped as the new input block.

3. The storage device according to claim 1, wherein
the controller is further configured to receive a write command including the stream ID, and write data, and in response thereto, write the write data into the new input block.

4. The storage device according to claim 3, wherein
the controller is further configured to write a portion of the write data in a physical block different from the new input block, when capacity of the new input block is smaller than a size of the write data.

5. The storage device according to claim 1, wherein
the controller is further configured to, in response to the second command, remap a physical block that is currently mapped as an input block, as a pending input block into which no data are written as long as mapping as the pending input block is maintained.

6. The storage device according to claim 5, wherein
the controller is further configured to remap the pending input block as another new input block for storing a portion of the write data, when the new input block becomes full.

7. The storage device according to claim 5, wherein
the controller is further configured to remap the pending input block as a second input block for storing data that are not associated with the stream ID.

8. The storage device according to claim 5, wherein
the controller is further configured to write dummy data into the currently-mapped input block before being remapped as the pending block.

9. The storage device according to claim 1, wherein
when the second command includes a size of write data associated with the stream ID, a physical block having capacity equal to or greater than the size is remapped as the new input block.

10. The storage device according to claim 1, wherein
the controller is further configured to receive a write command including the stream ID, and write data, and when the controller receives the write command next to the first command, write the write data into the unwritten space in the physical block.

11. A computing device comprising a processing unit programmed to carry out a method of issuing commands to store write data in a storage device having a non-volatile semiconductor memory device including a plurality of physical blocks, said method comprising:
issuing a first command including a stream ID;
in response to the first command, receiving information on capacity of unwritten space in a physical block, which is currently mapped as an input block for storing data associated with the stream ID;
if a size of the write data is greater than the capacity, issuing a second command including the stream ID to remap a physical block that is associated with no stream ID as a new input block for the stream ID, wherein the second command is a command different from a write command and different from a read command; and
if the size of the write data is not greater than the capacity, issuing the write command including the stream ID to write the write data into the currently-mapped input block.

12. The computing device according to claim 11, wherein said method further comprises:
if the size of the write data is greater than the capacity, issuing also the write command including the stream ID to write the write data into the new input block.

13. The computing device according to claim 11, wherein
the second command also causes all data in the physical block to be erased, before the physical block is remapped as the new input block.

14. The computing device according to claim 11, wherein
the second command also causes the currently-mapped input block to be remapped as a pending input block into which no data are written as long as mapping as the pending input block is maintained.

15. The computing device according to claim 14, wherein
the second command also causes the pending input block to be remapped as another new input block for storing a portion of the write data, when the new input block becomes full.

16. The computing device according to claim 14, wherein
the second command also causes the pending input block to be remapped as a second input block for storing data that are not associated with the stream ID.

17. The computing device according to claim 14, wherein
the second command also causes dummy data to be written into the currently-mapped input block, before being remapped as the pending input block.

* * * * *